United States Patent [19]

Massengeil et al.

[11] Patent Number: 4,540,166
[45] Date of Patent: Sep. 10, 1985

[54] AUTOMATIC FEEDER

[75] Inventors: Hans A. Massengeil, Munich, Fed. Rep. of Germany; Robert Overmeer, Mortsel, Belgium; Joachim Pietruska, Fürstenfeldbruck, Fed. Rep. of Germany; Jean J. Caufriez, Brussels, Belgium

[73] Assignee: AGFA-Gevaert AG, Leverkusen, Fed. Rep. of Germany

[21] Appl. No.: 497,733

[22] Filed: May 24, 1983

[30] Foreign Application Priority Data

May 28, 1982 [DE] Fed. Rep. of Germany ....... 3220235

[51] Int. Cl.³ .................. B65H 1/06; B65H 9/06; B65H 31/20
[52] U.S. Cl. ..................................... 271/3.1; 271/171; 271/223; 271/245; 271/253; 355/3 SH
[58] Field of Search .................. 271/3.1, 4, 241, 253, 271/254, 255, 245, 246, 223, 226, 229, 164, 171, DIG. 9; 355/3 SH, 75

[56] References Cited

U.S. PATENT DOCUMENTS 3,592,464  7/1971  Kanda .................................. 271/223
4,129,295 12/1978  Hori et al. ................. 271/DIG. 9 X
4,171,128 10/1979  Irvine et al. ............................. 271/3
4,428,667  1/1984  Phelps et al. ............................ 355/3

FOREIGN PATENT DOCUMENTS 2550985  5/1976  Fed. Rep. of Germany .

Primary Examiner—George E. A. Halvosa
Assistant Examiner—Lawrence J. Goffney, Jr.
Attorney, Agent, or Firm—Michael J. Striker

[57] ABSTRACT

An automatic feeder for a photographic copying machine includes a housing and a plate for supporting a stack of originals which are consecutively conveyed towards a transparent exposure plate positioned on the copying machine. The feeder is provided with adjustable tappet rollers mounted against the exposure plate to receive a front edge of an original moved along the exposure plate, without damaging the front edge. The plate for supporting the stack of originals includes adjustable stops for adjusting the plate to differing formats of the originals being processed. An adjusting lever connected to the adjustable stops for adjusting the latter is operatively connected to an adjustment device for adjusting the position of tappet rollers along the exposure plate. Pivotable transport rollers are provided to hold the original against the exposure plate. The housing of the feeder is pivotable relative to the housing of the copying machine between an open and closed position.

12 Claims, 1 Drawing Figure

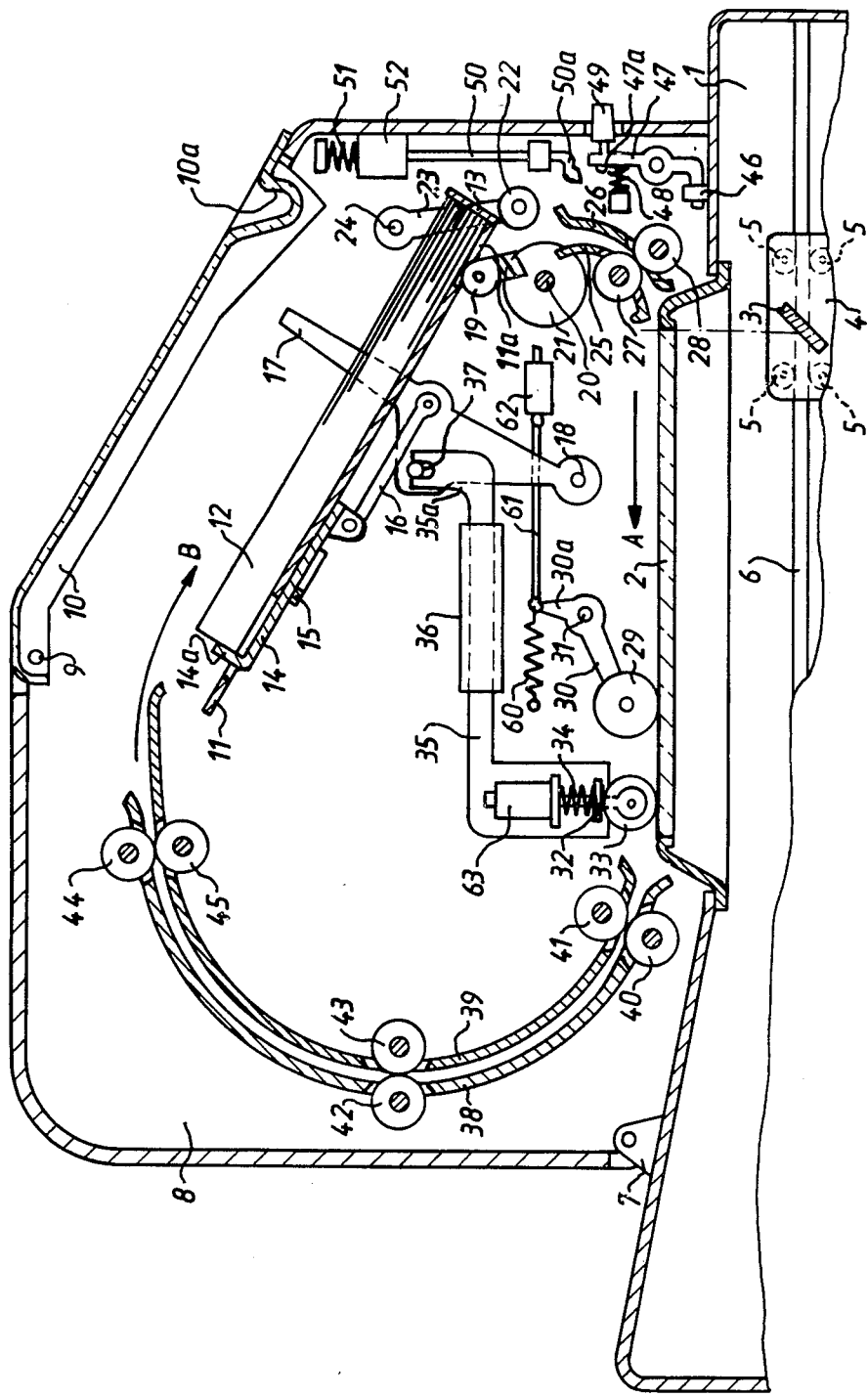

AUTOMATIC FEEDER

BACKGROUND OF THE INVENTION

The present invention pertains to an automatic feeder operated with a photographic copying machine, for feeding originals from a stack to an exposure plate or window of the copying machine for projecting the original and from the exposure plate back to the stack.

A feeder of the type under consideration is disclosed in German patent publication No. DE-AS 25 50 985. When originals enter the region of the exposure plate in the disclosed feeder the front edge of the respective original is held during the transport path by pivotable aligning pads. Such an arrangement can, however, cause damage to the original being processed. Furthermore, the conventional device has no means for adjusting the feeder to certain format lengths of the originals being processed.

SUMMARY OF THE INVENTION

It is an object of the invention to provide an improved feeder for transporting originals across the exposure window of the photographic copying machine.

It is a further object of the invention to provide an automatic feeder which can be adjusted to differing lengths of originals to be processed in the copying machine.

These and other objects of the invention are attained by an automatic feeder for feeding originals in a photographic copying machine of the type in which an original is transported across a transparent exposure plate for projecting in an exposure station of the copying machine, comprising supporting means for receiving a stack of originals lying in said stack in a predetermined orientation in which lower sides of the originals face said supporting means, means for transporting the originals from said stack towards said exposure plate and from said exposure plate back to said stack and operative for returning the originals to said stack in said predetermined orientation, said exposure plate having a front end and a rear end as viewed in the direction of transportation of an original; a number of non-driven tappet rollers positioned against said exposure plate at the front end thereof for receiving a front edge of the original when the latter is positioned on said exposure plate; displaceable stop means on said supporting means for adjusting said supporting means to differing lengths of originals being processed; first adjustment means for displacing said stop means and adjusting the latter on said supporting means; second adjustment means connected to said tappet rollers for adjusting the latter relative to said exposure plate in said direction of transportation, said first adjustment means being operatively connected to said second adjustment means so that the adjustment of said stop means to a predetermined format length of the originals by said first adjustment means causes a corresponding adjustment of said tappet rollers by said second adjustment means. The tappet rollers may be biased by springs or operate under the action of weight.

According to a further feature of the invention the first adjustment means may include a first slider connected to said stop means and said second adjustment means include a second slide convected to said tappet rollers, the feeder further including an adjustment lever operatively connected to said first slide and said second slide.

Furthermore, the transporting means may include first transport rollers arranged before said exposure plate in said direction of transportion, said first transport rollers being disposed from said tappet rollers at such a distance which ensures that a rear edge of the original transported across said exposure plate leaves said first transport rollers before the front edge of said original contacts said tappet rollers.

The tappet rollers may be liftable away from the exposure plate.

The feeder may further include second transport rollers mounted against said exposure plate and pivotable to and away therefrom, the second transport rollers holding an original on the exposure plate after the rollers have been pivoted to the exposure plate.

The feeder may further include means for lifting the tappet rollers away from said exposure plate and means for pivoting the second transport rollers to and away from the exposure plate.

According to a still further feature of the invention the feeder may be provided with first magnet means for actuating said lifting means and second magnet means for actuating said pivoting means, said first and second magnet means being controllable by an operator from a central control unit of the copying machine.

The feeder may be enclosed with a housing, said housing being pivotally connected to the copying machine and being pivotable between an open position and a closed position. The housing may include a transparent cover pivotally supported to said housing.

The feeder may further include means for locking the housing in its closed position.

The feeder may also include arresting means cooperating with said locking means to hold the housing in the closed position during a copying process.

The arresting means may include a slide with a hook and a magnet for actuating said slide, said magnet being controllable by an operator from the central control unit of the copying machine.

The locking means may include a lever having a stop, said stop engaging with said hook when said slide is actuated by the magnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing shows a schematic sectional view of an automatic feeder for feeding originals to an exposure station of the copying machine, according to the invention.

DETAILED DESCRIPTION OF THE PREFERRED EMBODIMENTS

Referring now to the drawing, a reference character 1 designates a copying machine on which an exposure plate 2 for supporting originals to be projected is provided. A projection optics or scanning mirror 3 serves for imaging strip-like sectors of the originals onto a sheet or web of recording medium disposed in the copying machine. The projection optics 3 is arranged in the copying machine so that a structure 4, conveying optics 3 is guided along a rail 6 by means of guide rollers 5.

A bearing block 7 is mounted to the upper edge of the copying machine 1. A housing 8 of the automatic feeder according to the invention is pivotally supported on a pivot of bearing block 7. Housing 8 is covered with a cover 10 which is pivotally supported on a pivot 9 with respect to housing 8, whereby cover 10 can be pivoted by an operator in the upward direction about pivot 9. A gripping depression 10a is provided at the end of cover 10 for facilitating the opening of the latter.

A support plate 11 for supporting a stack 12 of originals thereon is mounted within housing 8 of the feeder. Stack 12 is supported at its front end by means of a stack support 13. The limiting of the stack in the rearward direction is provided by means of slidable stops 14a arranged on a slide 14. In the preferred embodiment stops 14a are formed integral with slide 14. The latter is able to slide along a guide plate 15 in the lengthwise direction thereof. Plate 15 is connected to support plate 11. The slidable stops 14a with slide 14 are connected to an adjustment lever 17 by means of a push rod 16, lever 17 being supported on an axle 18 of housing 8. Therefore stops 14a are displaceable to and from support 13 to adjust plate 11 to differing format lengths of originals disposed in stack 12.

Plate 11 is provided in the region of support 13 with a recess 11a. The separation of a lowermost sheet in the stack from the superposed originals is carried out by means of a pivotable suction feeder 19 which cooperates in the known fashion with the end of the lowermost sheet in the stack through the recess 11a of plate 11. The suction feeder 19 while pivoting seizes the front end of the lowermost original, separates it from the stack and feeds it between a transport or carrier roller 21 arranged on a stationary axle 20 and a pivotable transport or carrier roller 22. Transport roller 22 is positioned on a pivotable lever 23 which is pivotally supported on an axle 24 mounted to housing 8.

A paper guide 25, 26 is coupled to the transport roller-pair 21, 22. A further transport roller-pair comprised of rollers 27, 28 is arranged on the paper guide 25, 26 provided for a further transport of the separated original received from the transport roller-pair 21, 22 upon pivoting of transport roller 22.

Transport rollers 27, 28 convey the original in the direction of arrow A over transparent exposure plate 2 towards tappet rollers 33 which abut against the surface of support plate 2 under action of respective compression springs 32. Tappet rollers 33 clamp the front edge of the original, when the latter reaches tappet rollers, between the outer surfaces of the rollers 33 and the upper face of plate 2. Due to the fact that the front edge of the original enters a wedge like gap framed between the outer face of plate 2 and the peripheral surfaces of the tappet rollers 33 this front edge is protected against being damaged. Furthermore, the peripheral surfaces of non-driven or freely rotated or slightly braked tappet rollers 33, which are supported on a carrier arm 34, under the action of compression springs 32 are themselves subjected to no unilateral wear while the rollers 33 are further rotated over a small distance during each step of the advancement of the original under the rollers 33 so that during each step new portions of the peripheral surfaces of rollers 33 continuously come into contact with the front edge of the original being advanced.

Transport rollers 27, 28 are arranged distant from tappet rollers 33 as viewed in the direction of transportation denoted by arrow A whereby, if the feeder has been correctly adjusted to the certain format of the originals, the rear edge of the original being transported leaves the gap between rollers 27, 28 before the front edge of the original reaches the tappet rollers 33. The entrance of the original into the gap between rollers 33 and the upper face of plate 2 is effected exclusively due to the action of inertia which contributes to a careful treatment of the front edge of the original. Furthermore, slipping of the original held by the peripheral surfaces of tappet rollers 33 back to transport rollers 27, 28 is also prevented from occurring.

For further transport of originals after the projection of the latter the feeder is provided with transport rollers 29 which are arranged in the region of transparent exposure plate 2. Rollers 29 are positioned on pivotable levers 30 and can lie against the face of support plate 2 under the action of tension springs 60. It is to be understood that a number of tappet rollers 33 spaced from each other along the width of plate 2 as well as a number of transport rollers 29 also spaced from each other along the width of plate 2 are provided on the feeder according to the invention although only one tappet roller 33 and one transport roller 29 are shown in the FIGURE of the drawing. Transport rollers 29 during the projection phase of the process are lifted from the exposure plate 2 by means of a pulling rod 61 actuated by a magnet 62 which is controlled from a central control unit provided in the copying machine. Another magnet 63 connected to the arm 34 of tappet rollers 33 and also controlled from a central control unit of the copying machine interrupts contact of tappet rollers 33 with the face of support plate 2.

Displaceable carrier arm 34 serves the purpose of adjusting the position of tappet rollers 33 to a predetermined format of the originals being transported. To carry out such an adjustment arm 34 is positioned on a slide 35 which is guided at one side thereof in a guide 36 secured to housing 8. Slide 35 has at one end thereof a fork 35a the recess of which is in engagement with a pin 37 formed on the adjustment lever 17. When stops 14a are adjusted to a greater format length tappet rollers 33 which engage the front edge of the original being processed are adjusted accordingly due to the connection of lever 17 with slide 14, on the one hand, and with slide 35, on the other hand, whereby the distance between the rear edge of the original and transport rollers 27, 28 as well as the initial point of the projection optics 3 shown in FIG. 1 are maintained independently on the format length to which stops 14a and rollers 33 have been adjusted.

After projecting of originals transport rollers 29, which have been continuously driven but lifted away from plate 2 during the projection phase, are now, upon actuating magnet 62 and under the action of spring 60, pivoted towards the original on plate 2 whereas tappet rollers 33 by means of magnet 63 are lifted up whereby the original is set to a position to be moved in the direction of arrow A. The original, upon transporting in the direction of arrow A, enters a curved guide 38, 39 and is conveyed through continuously driven transport roller-pairs 40, 41; 42, 43 and 44, 45. The original leaves the guide 38, 39, then moves in the direction of arrow B to stack 12 and lies down onto the upper surface of stack 12. The original in its path through guide 25, 26 and curved guide 38, 39 is turned over twice so that the original which was positioned in the stack with its film impression side exposed enters the copying station with its film-impression side in the underlying position and is laid down on the stack 12, after passing guide 38, 39, again with its film-impression side exposed, e.g. in the orientation corresponding to the original orientation of the sheet in stack 12. In this final position is the film-impression side of the original seen through transparent cover 10 whereby the complete path of the original is easily observed and controlled. Cover 10 is opened at gripping depression 10a for replacing the stack in the feeder or for repairing transport means if necessary and closed by clamping gripping depression 10a with the projection on the end of cover 10 on housing 8.

In the case when the original should be placed onto the transparent plate 2 manually, e.g. by a hand of an operator, the operator can open the whole housing 8 by pivoting the latter on bearing block 7 away from exposure plate 2 to free this plate. To prevent undesired pivoting of housing 8 on the pivot of bearing block 7 from occurring the housing 8 is provided with a locking means which includes a shackle 46 mounted to housing of the copying machine and a locking lever 47 which is the housing of the shackle 46 in the locking position. Lever 47 is biased with a compression spring 48 and is connected to an operating button 49 projected outwardly from housing 8. Locking lever 47 is unlocked by operating the button 49 against the action of spring 48.

Furthermore, an arresting slide 50 cooperates with its arresting hook 50a with the locking lever 47. Arresting hook 50a is maintained in disengagement with lever 47 due to the action of spring 51. Lever 47 is also provided with a stop 47a. The arresting slide 50 is coupled with an armature of a magnet 52 and when magnet 52 is actuated hook 50a of arresting slide 50 is forced into engagement with stop 47a. Magnet 52 which is also controlled from the central control unit of the copying machine is in the actuated position as long as the copying process lasts and until respective originals return to stack 12. The above described locking means prevents an inadvertent opening of housing 8 during the copying process.

It will be understood that each of the elements described above, or two or more together, may also find a useful application in other types of automatic feeders differing from the types described above.

While the invention has been illustrated and described as embodied in an automatic feeder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic feeder for feeding originals in a photographic copying machine of the type in which an original is transported across a transparent exposure plate for projecting in an exposure station of the copying machine, comprising supporting means for receiving a stack of originals lying in said stack in a predetermined orientation in which lower sides of the originals face said supporting means, means for transporting an original being processed from said stack towards said exposure plate and from said exposure plate back to said stack and operative for returning the original to said stack in said predetermined orientation, said exposure plate having a front end and a rear end as viewed in the direction of transportation of the original; a number of non-driven tappet rollers positioned against said exposure plate at the front end thereof for receiving a front edge of the original when the latter is positioned on said exposure plate; displaceable stop means on said supporting means for adjusting said supporting means to differing lengths of originals being processed; first adjustment means for displacing said stop means and adjusting the latter on said supporting means; second adjustment means connected to said tappet rollers for adjusting the latter relative to said exposure plate in said direction of transportation, said first adjustment means being operatively connected to said second adjustment means so that the adjustment of said stop means to a predetermined format length of the originals by said first adjustment means causes a corresponding adjustment of said tappet rollers by said second adjustment means, said tappet rollers being biased by springs, said first adjustment means including a first slide connected to said stop means and said second adjustment means including a second slide connected to said tappet rollers, the feeder further including an adjustment lever operatively connected to said first slide and said second slide.

2. The feeder as defined in claim 1, wherein said transporting means include first transport rollers arranged before said exposure plate in said direction of transportation, said first transport rollers being disposed from said tappet rollers at such a distance which ensures that a rear edge of the original transported across said exposure plate leaves said first transport rollers before the front edge of said original contacts said tappet rollers.

3. The feeder as defined in claim 2, wherein said tappet rollers are liftable away from said exposure plate.

4. The feeder as defined in claim 3, further including second transport rollers mounted against said exposure plate and pivotable to and away therefrom, said second transport rollers holding an original on said exposure plate after they have been pivoted to the exposure plate.

5. The feeder as defined in claim 4, further including means for lifting said tappet rollers away from said exposure plate and means for pivoting second transport rollers to and away from said exposure plate.

6. The feeder as defined in claim 5, further including first magnet means for actuating said lifting means and second magnet means for actuating said pivoting means, said first and second magnet means being controllable by an operator from a central control unit of the copying machine.

7. The feeder as defined in claim 6, further including a housing, said housing being pivotally connected to the copying machine and being pivotable between an open position and a closed position.

8. The feeder as defined in claim 7, wherein said housing includes a transparent cover pivotally supported to said housing.

9. The feeder as defined in claim 8, further including means for locking said housing in said closed position.

10. The feeder as defined in claim 9, further including arresting means cooperating with said locking means to hold said housing in the closed position during a copying process.

11. The feeder as defined in claim 10, said arresting means including a slide with a hook and a magnet for actuating said slide, said magnet being controllable by an operator from the central control of the copying machine.

12. The feeder as defined in claim 11, wherein said locking means include a lever having a stop, said stop engaging with said hook when said slide is actuated by said magnet.

* * * * *